July 29, 1952     E. W. RISTOW     2,604,795
ANGULAR DRIVE
Filed March 8, 1950
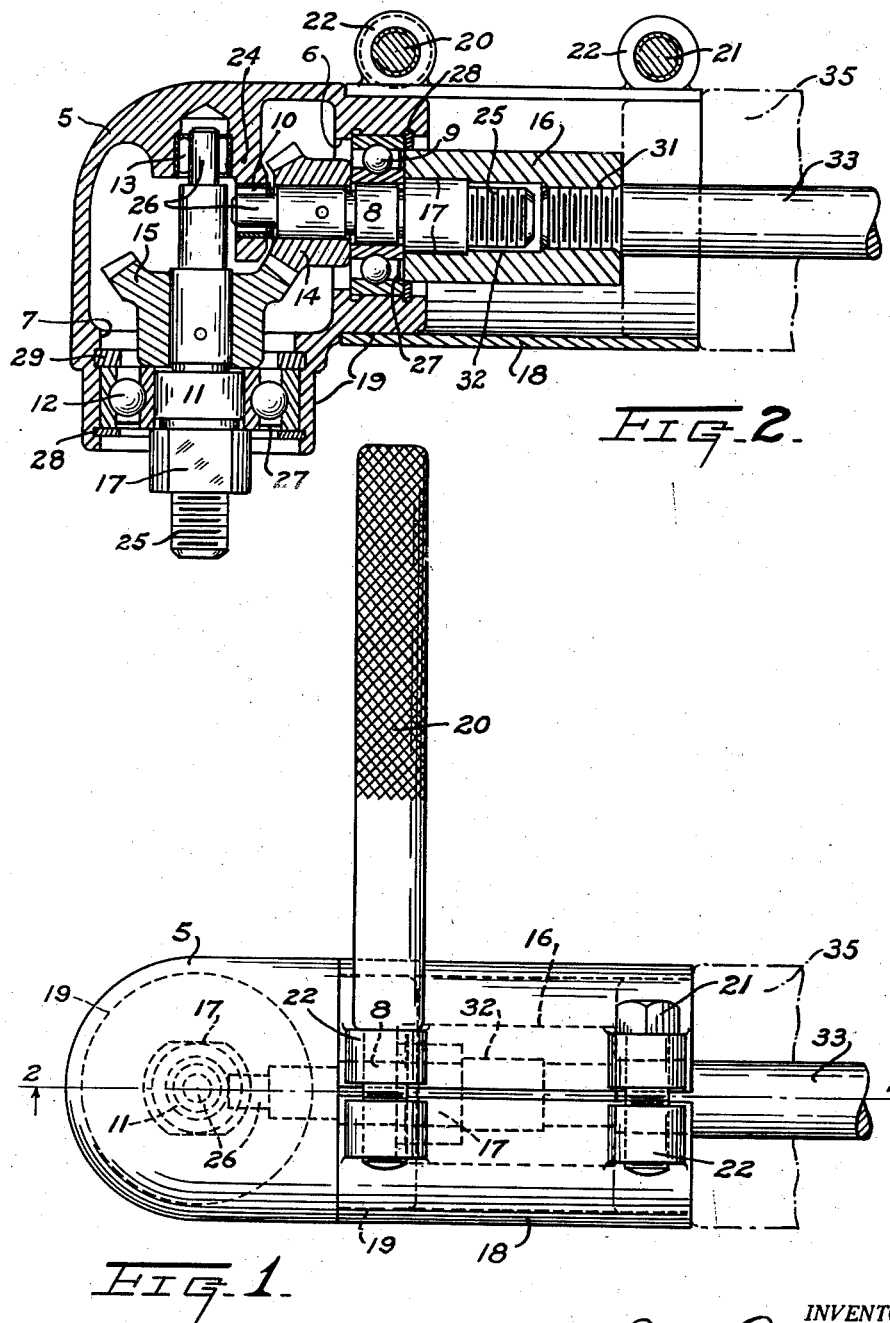
INVENTOR.
E. W. Ristow
BY
Lieber & Lieber
ATTORNEYS Patented July 29, 1952

2,604,795

UNITED STATES PATENT OFFICE 2,604,795

ANGULAR DRIVE

Edward W. Ristow, Milwaukee, Wis., assignor to Milwaukee Electric Tool Corporation, Milwaukee, Wis., a corporation of Wisconsin Application March 8, 1950, Serial No. 148,286

2 Claims. (Cl. 74—417)

The present invention relates in general to improvements in the art of rotary motion transmission, and relates more particularly to improvements in the construction and operation of drives for transmitting rotary motion at an angle from a source of power to a driven member.

The primary object of my invention is to provide an improved positive drive for transmitting rotary motion from one shaft or the like to another, which is simple and compact in construction, efficient in operation, and flexible in its adaptations.

Some of the more important specific objects of the invention are as follows:

To provide a reversible gear drive for positively and effectively transmitting rotary motion from a driving to a driven member at definite speeds.

To provide an exceedingly compact and durable power transmitting unit especially cooperable with portable driving motors and diverse tools, and which is adapted for quick reversal so as to propel the driven tools at several speeds.

To provide an improved right angle driving assemblage embodying bevel motion transmitting gears which are journalled in anti-friction bearings effectively housed within a sturdy casing.

To provide an improved rotary motion transmitting device which may be conveniently and effectively coupled to a driving shaft and suspended from the shaft mounting of the driving mechanism.

To provide an improved right angle bevel gear drive in which the gears and bearings may be abundantly lubricated and are constantly protectively concealed.

To provide an improved power transmitting assembly for transferring rotary motion at an angle relative to the axis of rotation of the driving member, and means for facilitating manipulation of the driven member in cramped and relatively inaccessible places.

To provide a sturdy and compact motion transmitting unit adapted to transfer rotary motion from one shaft to another at a right angle with minimum friction loss, and which may be conveniently applied to or removed from the driving source.

To provide an improved angle drive mechanism which is capable of being disposed in various positions to effectively transmit rotary motion from a driving shaft to a driven shaft, and which may be manufactured and sold for diverse uses, at moderate cost.

These and other objects and advantages of the present invention will be apparent from the following detailed description.

A clear conception of the improved features constituting my invention, and of the construction and operation of a typical right angle driving unit embodying the same, may be had by referring to the drawing accompanying and forming a part of this specification wherein like reference characters designate the same or similar parts in the several views.

Fig. 1 is an external view or elevation of a typical right angle drive embodying the invention and associated with a power shaft to obtain reduced speed of rotation at the driven member; and Fig. 2 is a central section through the assemblage of Fig. 1, taken along the line 2—2.

The gist of the present invention is the provision of a compact angle drive for transmitting rotary motion from a driving source to a driven member at either of two speeds, and having means for facilitating manipulation and for readily mounting and drivingly connecting the unit, and while only one typical embodiment of the invention has been shown and described it is not my desire or intent to unnecessarily limit the utility of the improved features by virtue of this restricted showing. It is moreover contemplated that specific descriptive terms used herein be given the broadest possible interpretation consistent with the actual disclosure.

Referring to the drawing, the improved motion transmitting unit illustrated therein comprises in general, a unitary rigid casing or hollow body 5 having therein two bores or openings 6, 7 directed perpendicular to each other toward a common point within the body; a shaft 8 disposed coaxially of the bored opening 6 and being journalled for rotation in anti-friction bearings 9, 10 mounted in the casing body 5; another shaft 11 disposed coaxially of the bored opening 7 and being journalled for rotation in anti-friction bearings 12, 13 mounted in the casing body 5; a bevel gear 14 secured to the shaft 8 between the bearings 9, 10 and meshing with a bevel gear 15 secured to the shaft 11 between the bearings 12, 13; a sleeve coupling 16 interchangeably drivingly cooperable with identical flattened portions 17 formed on the outerwardly protruding ends of the two shafts 8, 11; a split mounting sleeve 18 clampingly cooperable with either of two similar outer annular surfaces 19 formed on the body 5 around the openings 6, 7; and a manipulating handle 20 and a cap screw or bolt 21 cooperable with ears 22 formed on the sleeve 18 to clamp the opposite ends of the latter upon a surface 19 and to a support.

The casing body 5 is preferably formed of a one-piece casting of durable metal and is internally inaccessible except through the bored openings 6, 7, and the interior of the body 5 is provided with an integral boss 24. The two shafts 8, 11 are of somewhat similar construction, each being provided with an identical screw threaded extreme outer end 25 beyond the flattened portion 17 thereof, and with a reduced extreme inner end 26. The larger anti-friction bearings 9, 12 which coact with the shafts 8, 11, within the openings 6, 7 respectively, are of the sealed ball type of well known construction, being sealed by thin plates 27; and the smaller anti-friction bearings 10, 13 which coact with the inner reduced ends 26 of these shafts 8, 11 respectively are of the roller type also of well known construction, being mounted within bores in the rigid boss 24 as illustrated in Fig. 2.

The bevel gears 14, 15 are of different sizes and may be firmly fastened to their respective shafts 8, 11 in any suitable manner, and the ball bearings 9, 12 are detachably secured within the openings 6, 7 by means of snap rings 28 while these openings 6, 7 are made sufficiently large to permit insertion and removal of the adjacent gears 14, 15 therethrough when the snap rings 28 are removed. A removable split stop ring 29 may also be provided inwardly of the largest ball bearing 12, as shown, and the entire interior of the body 5 should normally be filled with suitable lubricant which will be confined within the gear chamber by the plates 27. An extremely compact rotary motion transmitting gear box or unit in which the gears 14, 15 are thoroughly lubricated and effectively protected, is thus provided.

The sleeve coupling 16 which may also be formed of durable metal such as steel, has a socket at one end adapted to be snugly applied to either of the flattened identical shaft portions 17, and is provided at its opposite end with internal screw threads 31, while its medial portion is provided with a bore 32 of larger diameter than the threaded shaft ends 25. The internal screw threads 31 of the coupling 16 may be formed to cooperate with the threads of the outer shaft ends 25 so that the coupling may be reversibly applied to either shaft 8, 11, but as shown, a rotary power shaft 33 has been drivingly applied to the internal coupling threads 31 whereby the unit is adapted to drive the shaft 11 at a slower rotary speed than that of the shaft 8.

The power shaft 33 may be positively rotated at any desired speed by an electric or other type of rotary motor, and is journalled for rotation in a portable support 35 shown in dot-and-dash lines in the drawing. The mounting sleeve 18 for the motion transmitting unit may be formed of resilient metal and is split longitudinally so that when the threaded shanks of the manipulating handle 20 and of the bolt 21 are released, the split sleeve 18 will spread and will be readily removable from or applicable to either of the annular surfaces 19 of the body 5, and to a similar surface formed on the support 35. The threaded shanks of the handle 20 and of the bolt 21 may be applied to either set of the clamping ears 22 which are rigidly attached to the opposite ends of the sleeve 18 adjacent to the split, and the handle 20 may be utilized to place the driven shaft in any desired position and to retain it in such position.

When the improved angular drive has been properly constructed and lubricated as hereinabove described, the screw threads 31 of the coupling 16 may be attached to the end of a rotary power shaft 33, and one end of the split sleeve 18 may be loosely applied to a support 35 associated with the power shaft, as shown. The motion transmitting unit may then be applied with either flattened shaft portion 17 thereof snugly inserted within the flattened end socket of the coupling 16 and with the adjacent annular surface 19 disposed within the other end of the mounting sleeve 18, whereupon the handle 20 and bolt 21 may be applied to the ears 22 to drivingly connect the shaft 33 with the adjacent shaft of the unit and to simultaneously clamp the body 5 to the support 35.

If the power shaft 33 is thus drivingly connected to the shaft 8 as illustrated in the drawing, then the other shaft 11 of the drive will be rotatable at slower speed than the shaft 11, but if the power shaft 33 is interchangeably drivingly connected to the shaft 11 the other shaft 8 will be driven at higher speed, by virtue of the different sizes of the gears 14, 15. After the improved unit has been properly installed to produce the desired operating conditions, a rotary tool such as a drill, may be secured to the protruding free end of the driven shaft either by direct screw thread attachment to the exposed shaft end 25 or with the aid of another sleeve coupling 16. The driving motor may then be operated at will to rotate the tool, and the handle 20 may thereafter be manipulated to direct and guide the rotating tool in any desired direction.

From the foregoing detailed description, it will be apparent that the invention provides a simple and exceedingly compact and durable motion transmitting unit which is very flexible in adaptation and may be operated at high or low speed with equal efficiency. The unitary gear housing body 5 is of sturdy construction and effectively protects the bevel gears 14, 15; while the anti-friction bearings disposed on the opposite sides of each of these gears and which also are protected by the housing, provide efficient supports for the shafts 8, 11 and for the gears 14, 15. The shafts 8, 11 may also be disposed at any desired angle relative to each other, and by forming these shafts with similar protruding end portions 17, 25 the coupling 16 may be reversibly attached to either end of either shaft and power may also be applied to either shaft end in order to obtain the selected speed of the driven shaft.

The improved mounting sleeve 18 also provides simple means for firmly supporting the unit at either of the annular surfaces 19, and the handle 20 and cap screw or bolt 21 serves to firmly clamp the split sleeve to the body 5 and to a support 35. The handle 20 also permits convenient movement of the body 5 into various positions in order to properly direct and guide the driven tool relative to the work in cramped localities, thus producing an extremely flexible assemblage adapted for diverse uses. The various parts of the geared rotary motion transmitting unit may also be readily assembled or dismantled, and these units may be manufactured in various sizes and for various purposes at moderate cost.

It should be understood that it is not desired to limit this invention to the exact details of construction or to the precise mode of operation of the angular drive herein specifically illustrated and described, for various modifications within the scope of the appended claims may occur to persons skilled in the art.

I claim:

1. In a universally positionable angular drive unit for transmitting rotary motion from a power source to diverse tools, a one-piece hollow body having therein two circular access openings directed axially at approximately 90° relative to each other toward a common point of intersection of the opening axes within the body and also having therein an integral boss bored coaxially of each opening and located near said intersection point remote from the corresponding opening, alined anti-friction bearings detachably confined within each of said openings and within its coaxial boss bore, a shaft journalled for rotation within each alined set of said anti-friction bearings, each of said shafts having an end projecting outwardly of said body and provided with a polygonal section and a male threaded tool attachment end of lesser diameter than the distance across the flats of the adjacent polygonal section, an adapter coupling having one end provided with a polygonal socket interchangeably drivingly cooperable with said polygonal shaft sections and being provided at its opposite end with female screw threads attachable to a driving source, and a pair of intermeshing bevel gears of different pitch diameters secured to said shafts in the spaces between said alined sets of bearings.

2. In a universally positionable angular drive unit for transmitting rotary motion from a power source to diverse tools, a one-piece hollow body having therein two circular access openings directed axially at approximately 90° relative to each other toward a common point of intersection of the opening axes within the body and also having therein an integral boss bored coaxially of each opening and located near said intersection point remote from the corresponding opening, alined anti-friction bearings detachably confined within each of said openings and within its coaxial boss bore, a shaft journalled for rotation within each alined set of said anti-friction bearings, each of said shafts having an inner end of smallest diameter journalled in one of said boss bearings and an opposite end portion of larger diameter journalled in the corresponding opening bearing and provided with a polygonal section and a male threaded tool attachment end of lesser diameter than the distance across the flats of the adjacent polygonal section located externally of the body, an adapter coupling having one end provided with a polygonal socket interchangeably drivingly cooperable with said polygonal sections and being provided at its opposite end with female screw threads attachable to a driving source, and a pair of intermeshing bevel gears of different pitch diameters secured to said shafts in the spaces between said alined sets of bearings and being removable only through the adjacent body openings.

EDWARD W. RISTOW.

REFERENCES CITED

The following references are of record in the file of this patent:

UNITED STATES PATENTS

| Number | Name | Date |
|---|---|---|
| 523,266 | Cochran | July 17, 1894 |
| 1,401,916 | Muench | Dec. 27, 1921 |
| 2,462,647 | Koza | Feb. 22, 1949 |
| 2,489,102 | Moore | Nov. 22, 1949 |

FOREIGN PATENTS

| Number | Country | Date |
|---|---|---|
| 360,189 | France | Apr. 14, 1906 |
| 722,442 | France | Mar. 16, 1932 |
| 309,591 | Italy | July 11, 1933 |
| 597,762 | Germany | May 30, 1934 |
| 674,799 | Germany | Apr. 22, 1939 |
| 401,806 | Italy | Feb. 2, 1943 |